(12) United States Patent
Rini et al.

(10) Patent No.: US 7,314,106 B2
(45) Date of Patent: Jan. 1, 2008

(54) VEHICLE CHASSIS WITH SIDE MOUNTED AIR INTAKE PLENUM

(75) Inventors: Nicholas Michael Rini, Duncan, SC (US); Mark Waitman Pitsenbarger, Moore, SC (US)

(73) Assignee: Freightliner LLC, Portland, OR (US)

( * ) Notice: Subject to any disclaimer, the term of this patent is extended or adjusted under 35 U.S.C. 154(b) by 298 days.

(21) Appl. No.: 10/840,923

(22) Filed: May 7, 2004

(65) Prior Publication Data

US 2005/0217908 A1    Oct. 6, 2005

Related U.S. Application Data

(60) Provisional application No. 60/558,877, filed on Apr. 2, 2004.

(51) Int. Cl.
*B60K 11/00* (2006.01)

(52) U.S. Cl. .................... 180/68.1; 180/68.4; 180/68.6

(58) Field of Classification Search ............... 180/68.1, 180/68.2, 68.3, 68.4, 68.6
See application file for complete search history.

(56) References Cited

U.S. PATENT DOCUMENTS

| | | | | |
|---|---|---|---|---|
| 3,856,100 A | * | 12/1974 | Manning | 180/68.1 |
| 4,267,895 A | * | 5/1981 | Eggert, Jr. | 180/68.1 |
| 4,846,258 A | * | 7/1989 | Charles | 165/41 |
| 5,588,482 A | * | 12/1996 | Holka | 165/44 |
| 5,794,733 A | * | 8/1998 | Stosel et al. | 180/68.1 |
| 5,816,350 A | * | 10/1998 | Akira et al. | 180/68.1 |
| 6,223,807 B1 | * | 5/2001 | Asche et al. | 165/43 |
| 6,564,892 B2 | * | 5/2003 | Wooldridge et al. | 180/68.4 |
| 6,871,697 B2 | * | 3/2005 | Albright et al. | 165/51 |
| 6,880,656 B2 | * | 4/2005 | Pfusterschmid et al. | 180/68.4 |
| 6,951,240 B2 | * | 10/2005 | Kolb | 165/42 |

OTHER PUBLICATIONS

Disclosure Statement.
Photograph illustrating vehicle hood location of a prior art form of air plenum.

* cited by examiner

*Primary Examiner*—Christopher P. Ellis
*Assistant Examiner*—Brian Swenson
(74) *Attorney, Agent, or Firm*—Klarquist Sparkman

(57) ABSTRACT

An elongated air intake plenum is disclosed together with mounting structure for supporting the plenum at the side of a vehicle chassis such as from the frame rail of a chassis for a motor home or recreational vehicle. The plenum and mounting structure is desirably positioned rearwardly of a rear axle of the chassis.

31 Claims, 10 Drawing Sheets

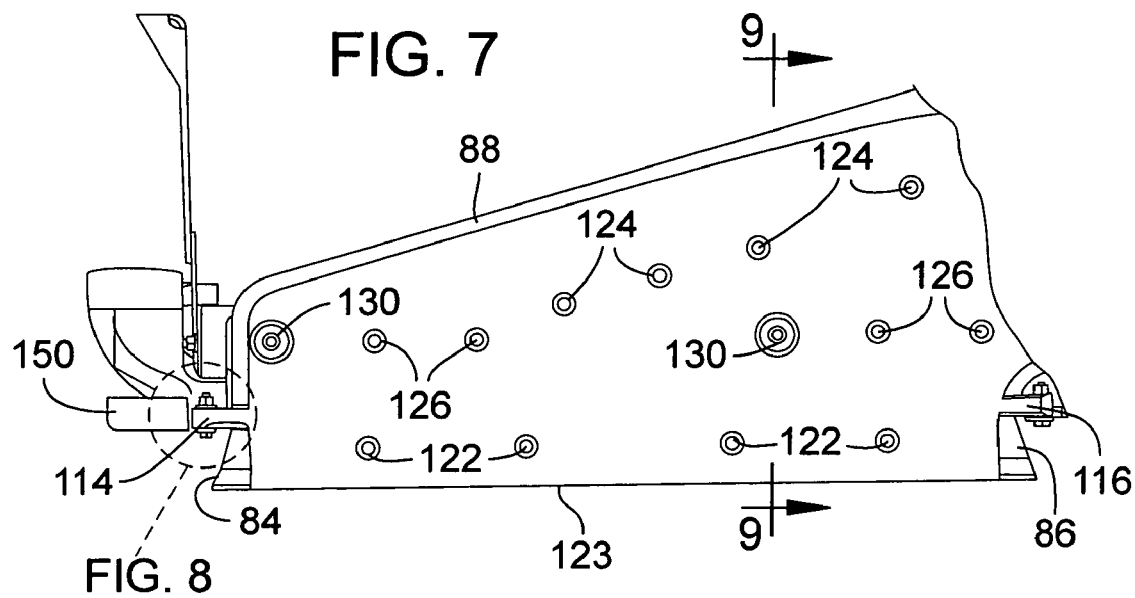
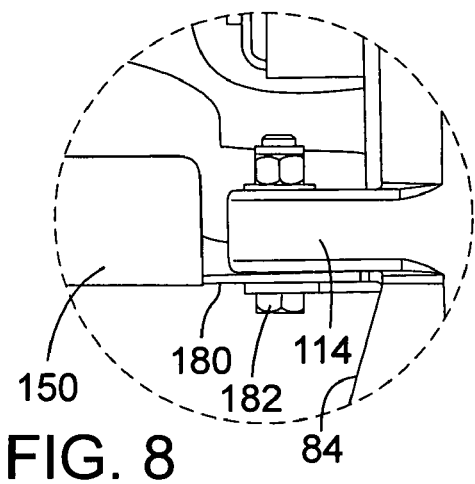
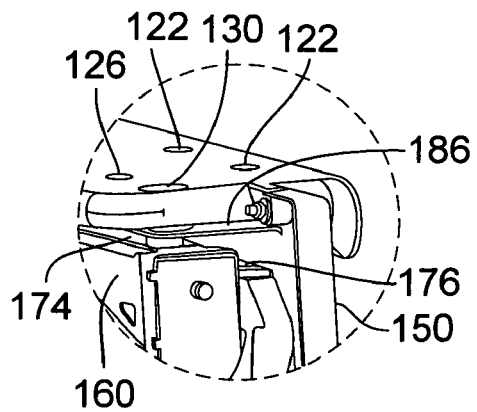

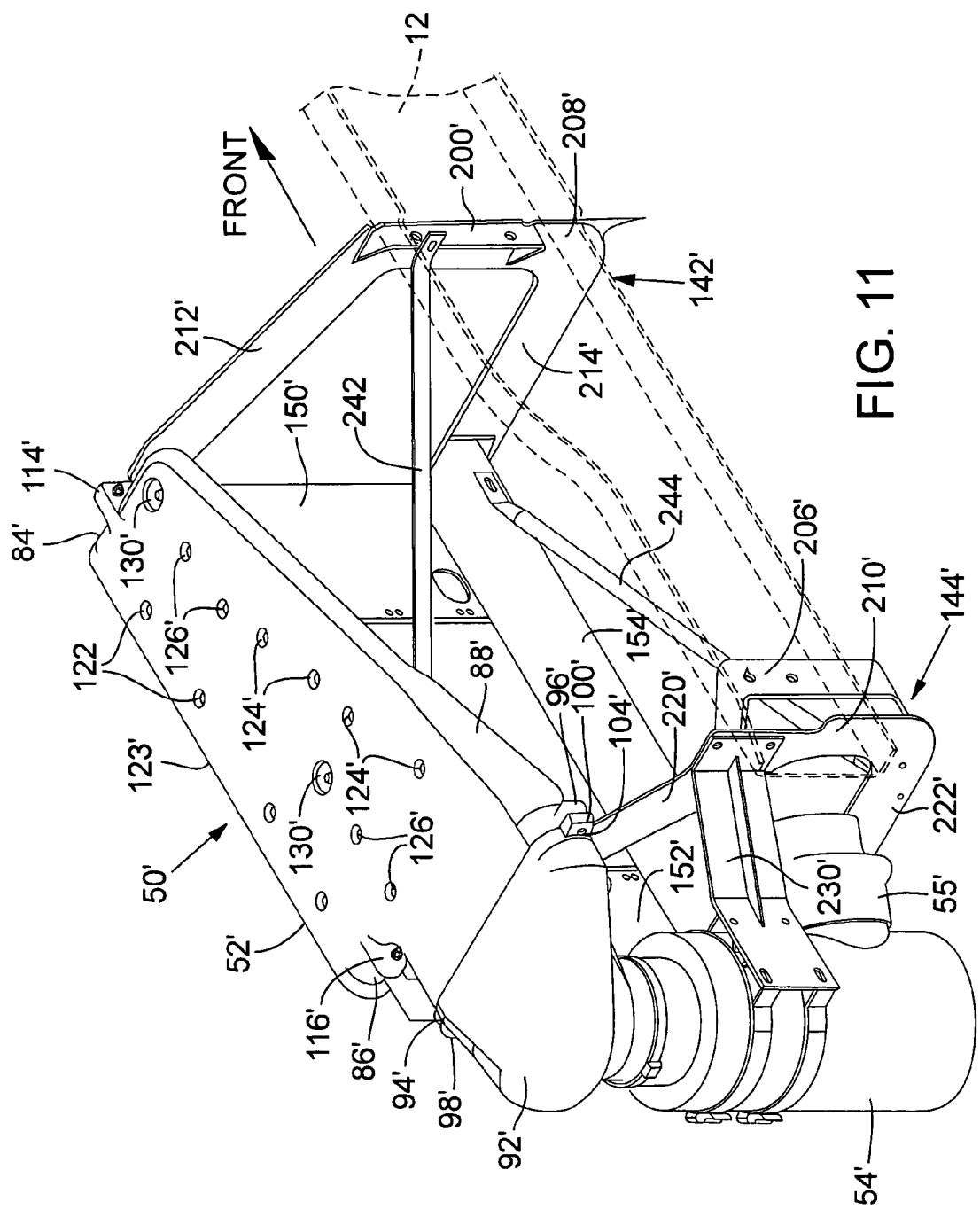

US 7,314,106 B2

VEHICLE CHASSIS WITH SIDE MOUNTED AIR INTAKE PLENUM

RELATED APPLICATION DATA

This application claims the benefit of U.S. provisional patent application No. 60/558,877, filed Apr. 2, 2004, entitled, "Vehicle Chassis With Side Mounted Air Intake Plenum", by Nicholas Michael Rini and Mark Waitman Pitsenbarger, which is hereby incorporated by reference.

TECHNICAL FIELD

The technology disclosed herein relates to air intake plenums for vehicle engines and to chassis assemblies with such air intake plenums. The technology is particularly applicable to air intake plenums for rear engines of recreational vehicle chassis assemblies, such as for motor homes.

BACKGROUND

Air intake systems including air plenums for internal combustion engines are known. However, such systems suffer from a number of drawbacks such as difficulties in installation, inefficiencies in air delivery, and problems associated with the maintenance of such systems.

Therefore, a need exists for improved air-intake plenums and for vehicle chassis with installed plenums.

SUMMARY

The present invention is directed toward novel and non-obvious features of air intake plenums disclosed herein and to chassis assemblies with such air intake plenums. The invention is directed to such features both alone and in combinations and subcombinations with one another as set forth in the claims below. The invention is not limited to any particular embodiment described herein or to embodiments which include all or some specific combination of features described herein. It should be noted that for purposes of this disclosure, the word "including" has the same broad meaning as the word "comprising". In addition, words such as "a" and "an" include the singular as well as the plural. Thus, if a device has "a feature", a device with two or more of such features has "a" feature as it has at least one of the said "a" features.

In accordance with one embodiment, an air intake plenum for a chassis of a vehicle is desirably supported from a frame rail of the chassis with an air intake opening facing toward the side of the vehicle. Air entering the air intake opening passes through an air cleaner and then eventually to the engine of the vehicle. Desirably, the air intake plenum is positioned adjacent to the rear end of the vehicle, for a rear engine driven vehicle such as a motor home or other recreational vehicle.

The air intake plenum is desirably carried by a frame which is mounted to a frame rail of the chassis of a vehicle. The air plenum may be positioned above a radiator or an air condenser of an air conditioning unit which is also carried by the frame.

Most desirably, the frame projects outwardly from the side of a frame rail of the chassis and may be positioned along the driver's side of the vehicle near the rear of the chassis.

The plenum may be mounted to the frame by fasteners which extend through the interior of the plenum. The plenum may be formed with plural supports such as tubular posts between upper and lower panel portions of the plenum with the posts having openings therethrough for receiving the plenum mounting fasteners.

Other new and non-obvious features will be apparent from the discussion below of exemplary embodiments of the air intake plenum and chassis technology.

DESCRIPTION OF THE DRAWINGS

FIG. 7 is a top view of a portion of the plenum of FIG. 4.

FIG. 8 is a top view of an exemplary mounting structure for coupling the plenum to a supporting frame.

FIG. 8A is an end view of the mounting structure of FIG. 8.

FIG. 11 is a perspective view of an alternative embodiment of an air intake plenum and supporting frame.

DETAILED DESCRIPTION

Figure 1:
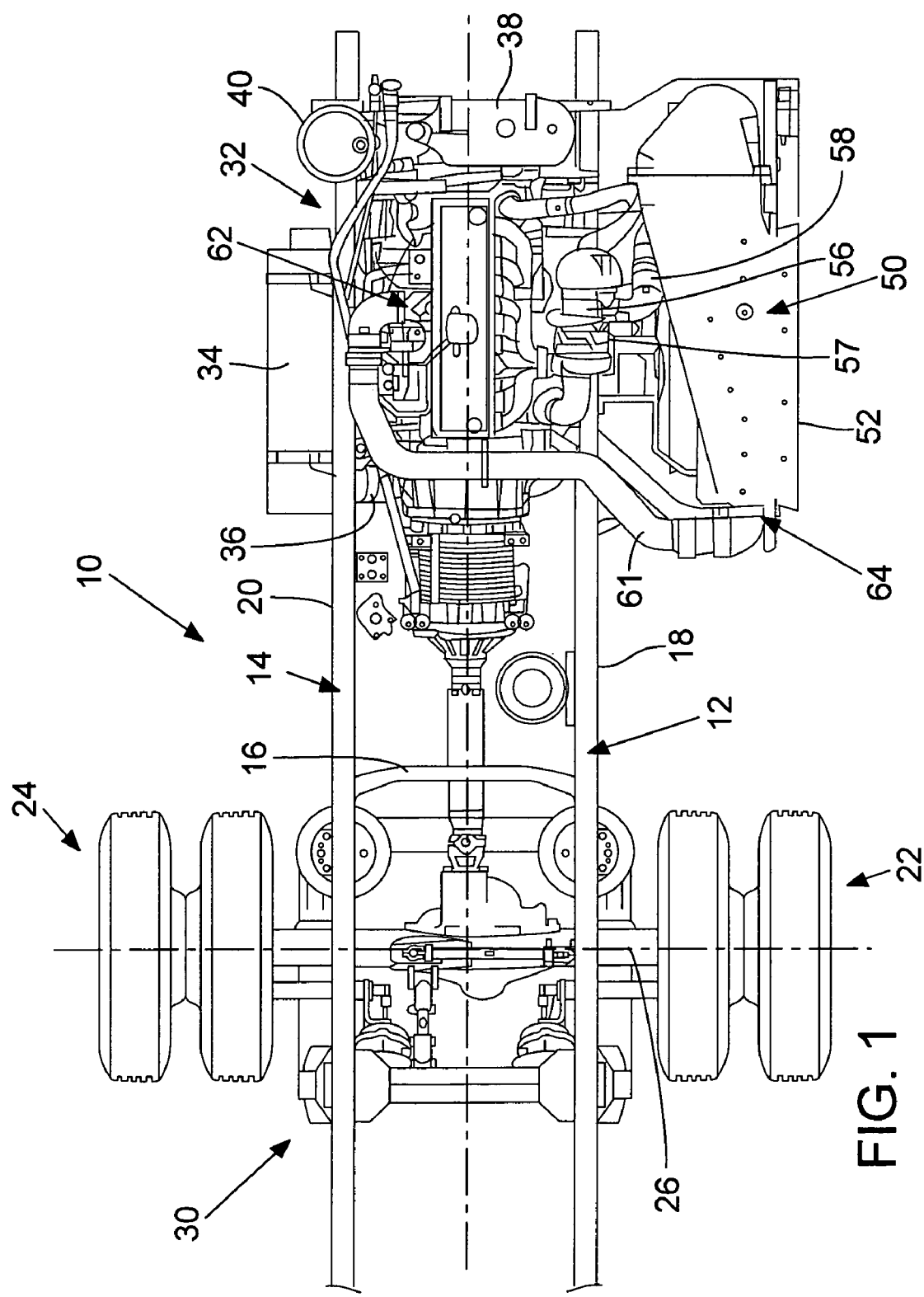
FIG. 1 is a top view of a rear portion of a chassis having a plenum in accordance with one embodiment.
Figure 2:
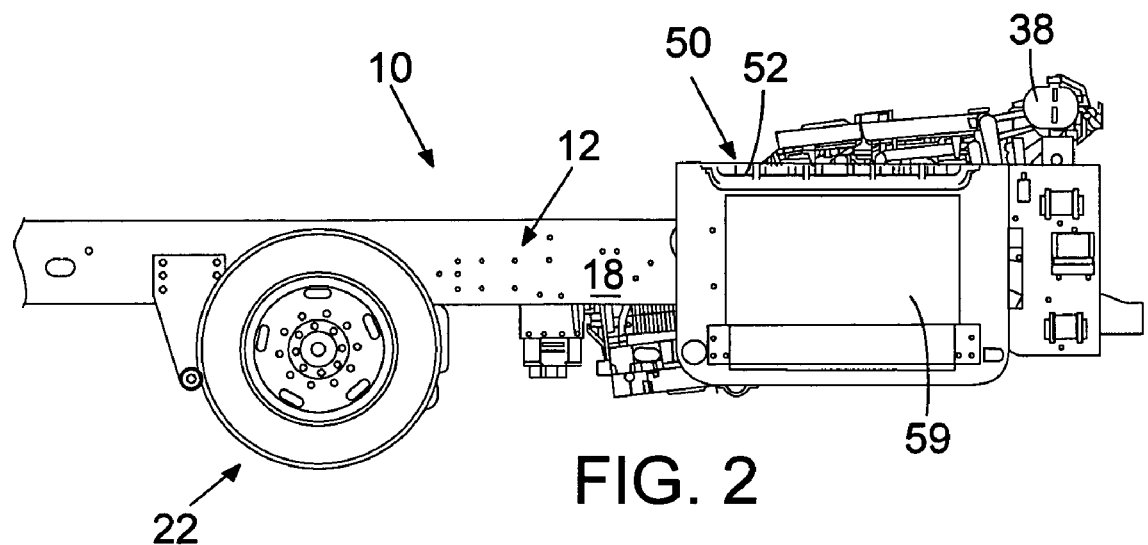
FIG. 2 is a side elevational view of the embodiment of FIG. 1.
Figure 3:
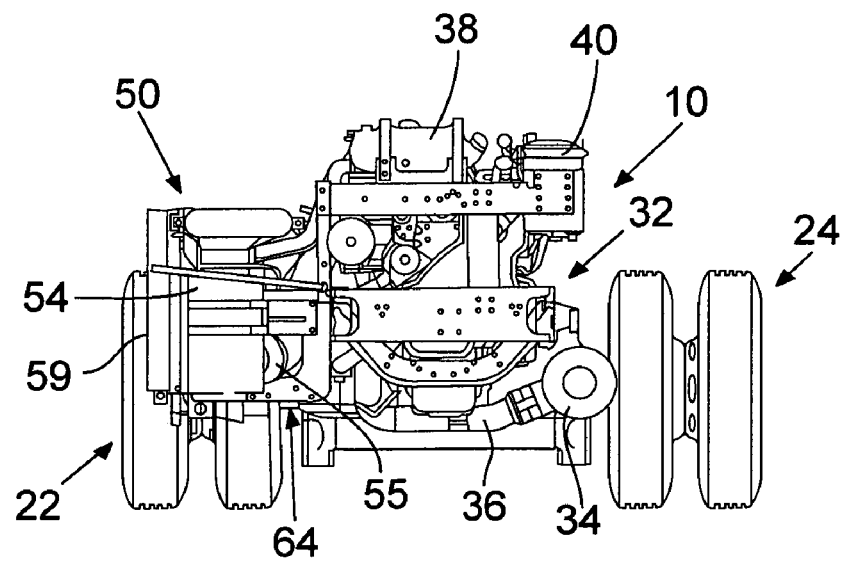
FIG. 3 is a rear view of the embodiment of FIG. 1.

FIGS. 1, 2 and 3 illustrate one form of a chassis 10 of a vehicle. The portion of the chassis illustrated in FIGS. 1 and 2 comprises first and second spaced apart elongated frame rails 12,14 which are interconnected by cross-members such as cross-member 16 shown in FIG. 1. Frame rails may be an assembly of frame rail sections or formed of one piece. The term "frame rail member" includes one or both of a section of a frame rail as well as an entire frame rail. The frame rail may be straight or have other configurations. The illustrated frame rails 12,14 have respective outboard side surfaces 18,20. The frame rails may be, for example, of a C-shaped configuration with upper and lower inwardly projecting flanges and a side web.

The illustrated chassis 10 comprises rear wheels and tires 22,24 which are rotatably mounted to an axle 26 which is suspended from the frame rails 12,14 by a suspension 30. An engine 32 may also be carried by the frame rails. In FIG. 1, the engine is positioned at the rear of the chassis and is rearwardly of the rear axle 26. The illustrated embodiment comprises a muffler 34 for muffling the engine exhaust delivered to the muffler by an exhaust conduit or pipe 36. Components such as a surge tank/coolant reservoir 38 and a hydraulic fluid reservoir 40 are also shown in these figures.

Figure 9:
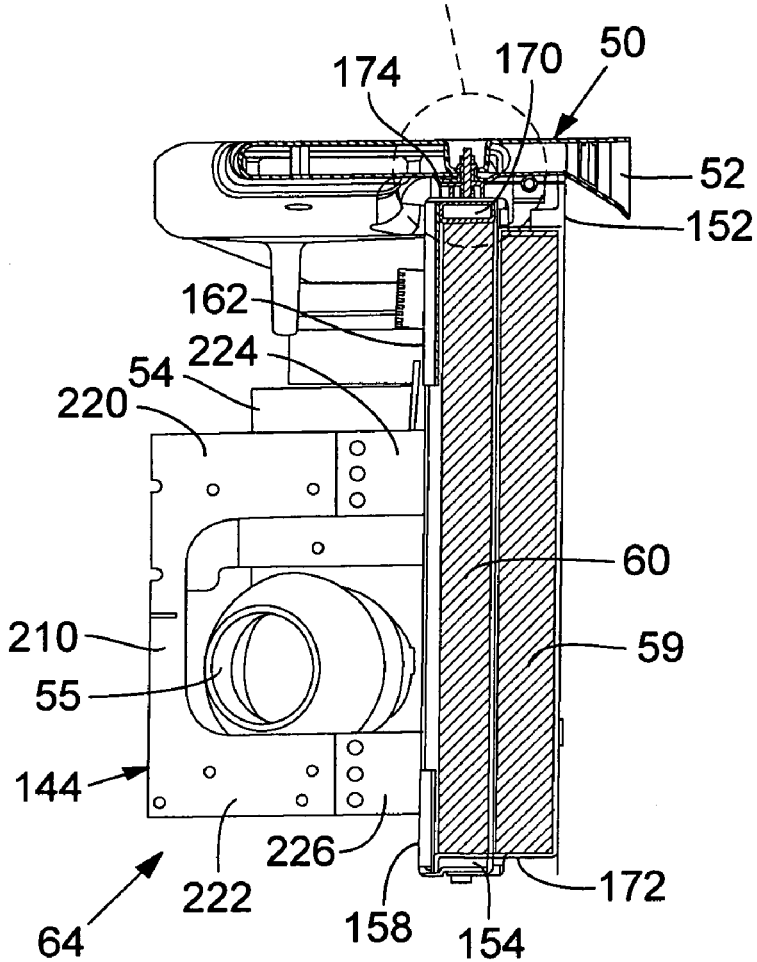
FIG. 9 is a vertical sectional view of the plenum embodiment of FIG. 5 taken along lines 9-9 of FIG. 7.

In the embodiments of FIGS. 1-3, the chassis assembly further comprises an air intake plenum 50 with an air intake opening 52 which desirably faces sidewardly relative to the longitudinal axis of the chassis. That is, opening 52 faces in an outboard direction in the form shown. Air entering the plenum 50 passes through an air cleaner 54 which contains an air filter. From air cleaner 54, the filtered air flows through a conduit section 55 (FIG. 4) and into an inlet 56 to a turbocharger 57 (FIG. 1). The outlet of turbocharger 57 is coupled by conduit 58 to a charge air cooler 59 (FIG. 2) positioned in front of a radiator 60 (FIG. 9). From the charge air cooler, air is directed via a conduit 61 (FIG. 1) above the engine to an inlet 62 of an air intake manifold of the engine. Alternative air flow paths from the plenum may be used if desired.

The plenum 50 is desirably supported by a frame included in the chassis assembly and more desirably by a frame coupled to a frame rail member of the chassis. The term "coupled" includes direct mounting or connection as well as indirect connection through one or more additional components. One form of a frame is indicated generally at 64 in FIGS. 1 and 3 and will be discussed in greater detail below. In the desirable construction indicated in FIGS. 1-3, the frame is coupled to the frame rail 12 at the driver's side of the vehicle and projects outwardly from the associated frame rail. With this construction, a chassis with an installed air plenum may be delivered to a body manufacturer, such as a manufacturer of motor homes or recreational vehicles, with the plenum pre-assembled as a part of the chassis. This saves the bodybuilder labor and facilitates the provision of an air intake assembly which is compatible with the engine being used in the vehicle. In FIG. 2, a side mounted radiator is provided with a charge air cooler 59 positioned in front of the radiator. Both the radiator and charge air cooler are desirably carried by the frame 64. In alternative embodiments, radiator 68 may be moved to other positions such as being mounted to the rear of the chassis. Other components may then be carried by the frame, such as an air condenser for an air conditioning unit. In addition, desirably the air cleaner 54 is also carried by the frame.

Figure 4:
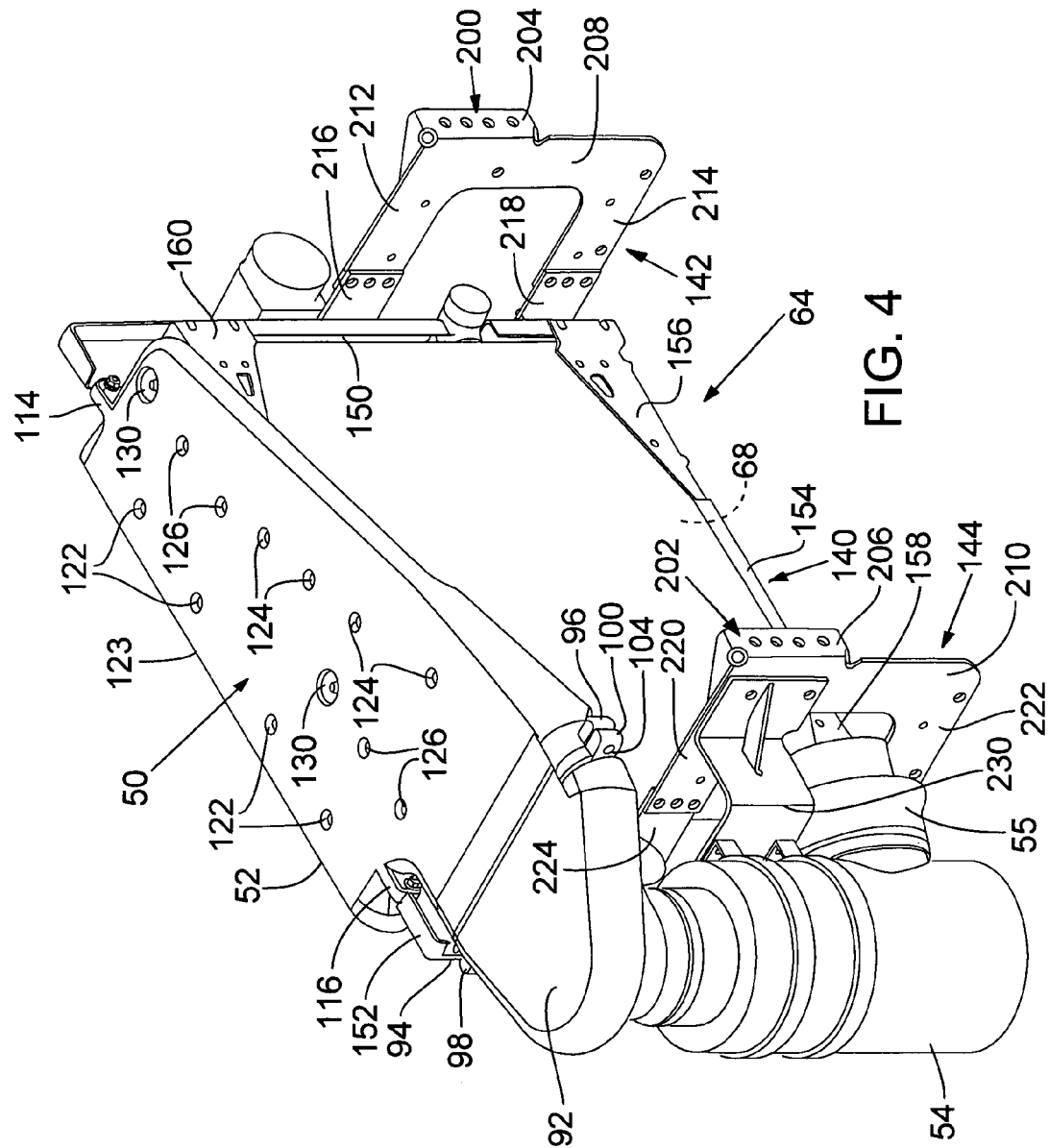
FIG. 4 is a perspective view of an embodiment of a plenum and supporting frame.
Figure 5:
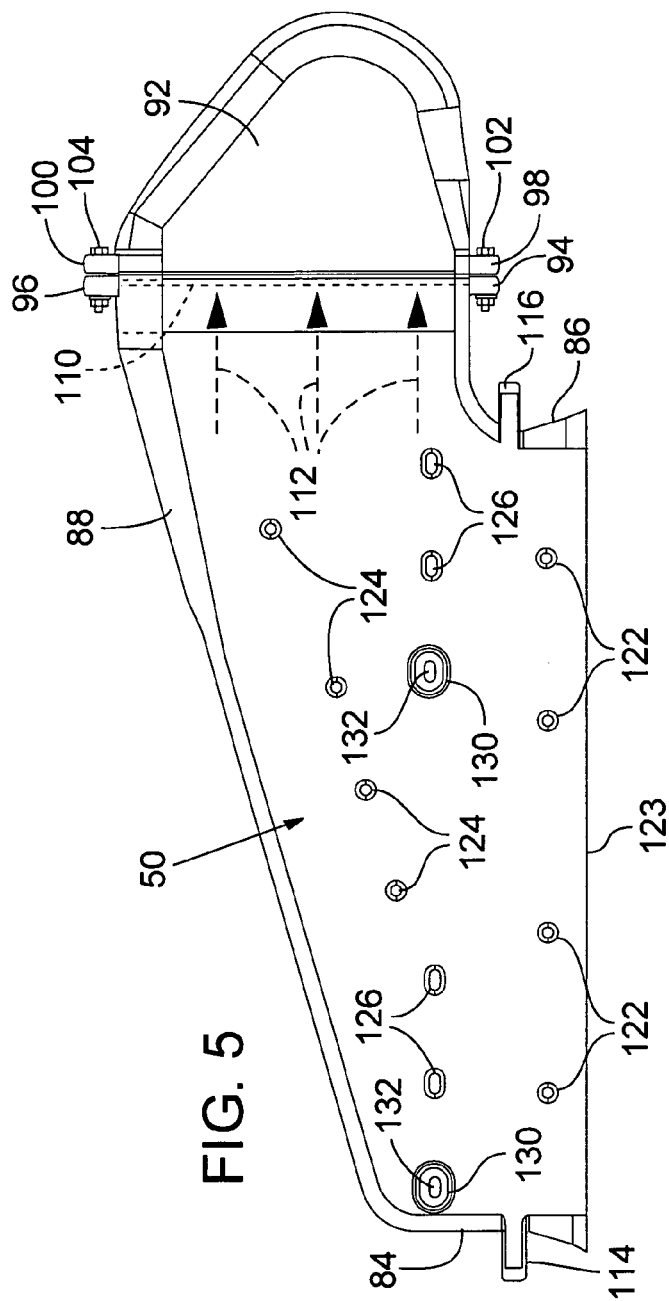
FIG. 5 is a top view of an embodiment of an air intake plenum.

With reference to FIGS. 4-7, the illustrated form of plenum 50 is desirably elongated and is of a height-compacted construction. For example, the air plenum 50 may have a mouth or inlet opening 52 that is about forty inches long (in a direction parallel to the longitudinal axis of the chassis) and about three inches high. The length to height ratio of mouth 52 in this example is greater than ten to one. The illustrated form of plenum comprises a top panel portion 80, a bottom panel portion 82, a first or left-hand end portion 84 (left with reference to FIG. 6), a second or right-hand front end portion 86 and a rear portion 88. Plenum 50 is coupled to an air cleaner intake chamber defining member 92 at the upper end of the air cleaner 54. The plenum 50 is desirably of a durable material such as being molded of a polymer material with nylon (Capron 8280 HS Nylon 6 resin from Allied Signal Corporation) being a specific example. With reference to FIG. 5, plenum 50 comprises first and second mounts 94,96 which abut respective mounts 98,100 of member 92. Fasteners, such as bolts 102,104, join the plenum 50 to the air cleaner portion 92 at these mounts. An internal passageway 110 communicates from plenum 50 to the internal chamber of member 92 to permit the flow of air between these components. The airflow is schematically indicated in FIG. 5 by arrows 112. A first air plenum mount 114 projects outwardly from end portion 84 and a second air plenum mount 116 projects outwardly from end portion 86 for use in mounting the plenum to the frame 64 as explained below.

Figure 6:
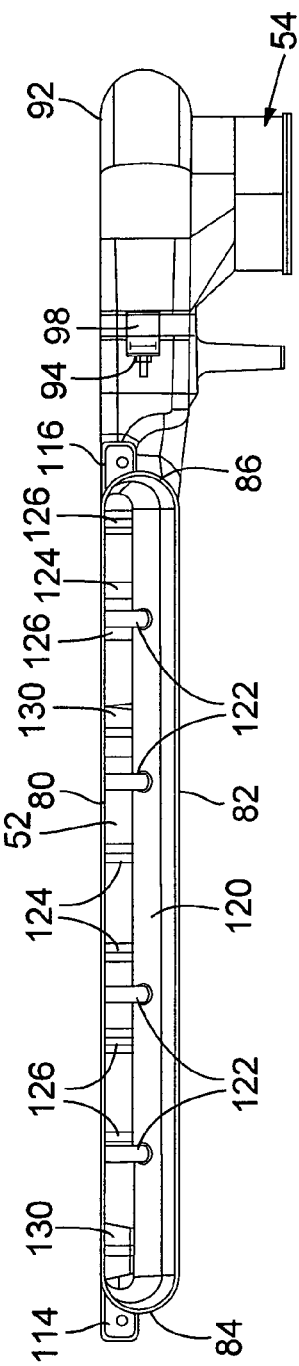
FIG. 6 is a side elevational view of the embodiment of FIG. 9.

With reference to FIG. 6, the illustrated air plenum opening 52 is somewhat funnel-like with panel portion 82 diverging downwardly from panel portion 80 in the direction of the opening 52 from the interior of the plenum. A downwardly inclined shelf section 120 of panel 82 is indicated in FIG. 6.

Figure 6A:
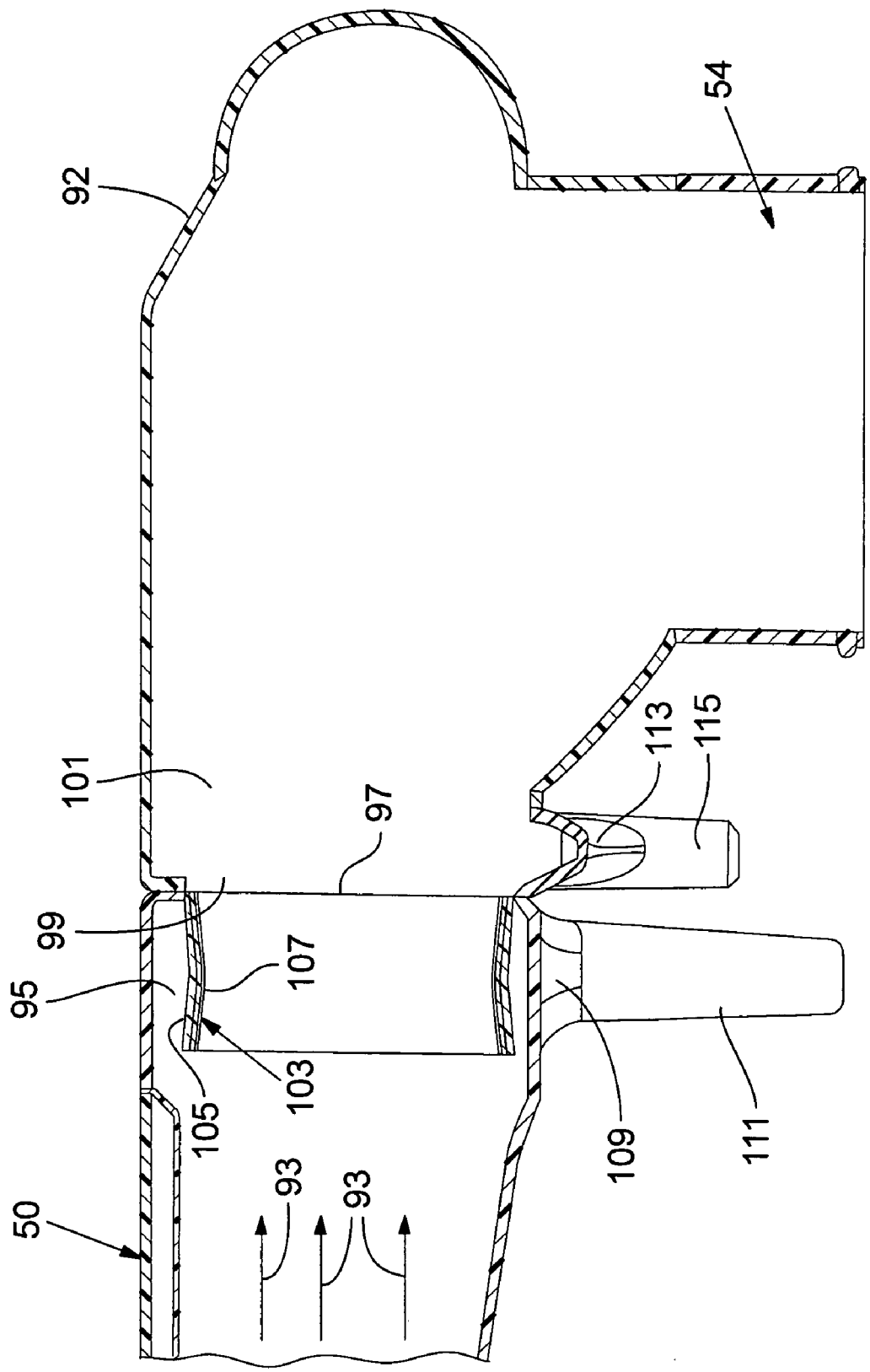
FIG. 6A is a vertical sectional view through an embodiment of a plenum and portion of an air cleaner with two separated water drains.

Referring to FIG. 6A, air flows (as indicated by arrows 93) from the interior of plenum 50 and toward an outlet or exit section 95 of the plenum. Outlet section 95 defines an outlet 97 which communicates with an inlet 99 of an inlet section 101 of the air cleaner 54. A passageway defining member is configured and positioned to create some turbulence in the air flow as air passes from plenum 50 into the air cleaner 54 to assist in removing water droplets from the air stream. In one specific form, an annular member 103 is positioned within section 95 and sized such that air flowing into cleaner 54 from plenum 50 passes through the member 103.

The illustrated member 103 comprises a form of a nozzle with an interior surface 107 that has a restricted cross-section in comparison to the nozzle entrance and exit. Surface 107 in the form shown is arcuate with an arched cross-section looking at a cross-section through a single wall section (e.g., the top portion of the wall shown in FIG. 6A) from the nozzle entrance to the nozzle exit. In addition, a gap is provided between the exterior wall 105 of the nozzle and the interior of the housing that bounds the outlet section 95. This geometry assists in water separation due to induced turbulence at the flow edges and adhesion effects; resulting in the collection of water on surface 105. The water flows downwardly along surface 105 to a drain opening 109 of a drain 111 and to the exterior of the system. An auxiliary or second drain opening 113 through a second downwardly projecting drain 115 is located in inlet section 101. Under relatively high velocity air flow conditions, moisture containing air may pass through nozzle 103 without depositing sufficient moisture. Additional moisture is captured, particularly under such circumstances, by drain 113 and exits from the system.

A plurality of reinforcements extend between panel portion 80 and panel portion 82 to reinforce the plenum. These reinforcements may take the form of tubular members or posts. In FIG. 6, four spaced apart posts 122, which may be of a circular cross-section, are positioned at locations spaced inwardly of the mouth 52. The posts 122 extend from shelf 120 to an undersurface of panel portion 80. The reinforcements 122 are in a row parallel to the front edge 123 (FIG. 5) of the illustrated plenum 50. The illustrated plenum has a rear wall portion 88 which diverges from front edge 123 moving from left to right in FIG. 5. A second group of reinforcements, such as tubular posts 126, which may be of any suitable shape, such as oval in cross-section, are shown in FIG. 5. The reinforcements 126 are shown in a line parallel to the line containing posts 122 and parallel to edge 123. Another row of reinforcements, which may be of any suitable shape such tubular posts having a circular cross-section, are indicated at 124 in FIG. 5. The posts 124 are on a line skewed from the front edge 123. That is, the rightmost post 124 is set back further from edge 123 than the leftmost post 124. Thus, the posts 124 are in a line which is generally parallel to the rear edge of the back portion 88. It should be noted that other reinforcing structures and patterns of such structures may be used to provide reinforcing support between panels 80 and 82. Supports with rounded or curved exposed surfaces, are desirable because they offer less resistance to air flow. These various reinforcements may be hollow to permit the passage of fasteners through the reinforcements. However, in the form shown, two reinforcements 130, in line with reinforcements 126, each define a respective passageway 132 that passes entirely through the plenum for use in mounting the plenum to the plenum supporting structure, such as to the frame 64 as explained below.

Desirably, the air intake plenum 50 is mounted to the same structure used to support a side-mounted radiator and/or an air conditioner condensing assembly (e.g., condenser grill or other air condenser components) regardless of the form of such structure. The example support structures described below are simply forms of suitable exemplary structures. The plenum support structure is not limited to any specific example.

Referring to FIG. 4, an illustrated form of frame 64 may have a front frame section 140 supported in an offset manner from the associated frame rail, in this case frame rail 12, by standoff frame members which may take the form of members indicated at 142 and 144. In the form shown, forward frame portion 140 comprises first and second upright frame sections 150,152 which are desirably parallel to one another and spaced apart. The frame also comprises a lower frame section 154 extending between the lower end portions of upright frame sections 150,152. Respective reinforcing gussets 156,158 reinforce the respective joints between upright frame section 150 and cross-member 154 and between upright frame section 152 and the cross-member. Reinforcing gussets 160,162 (FIG. 4 shows gusset 160 and FIG. 9 shows gusset 162) spaced below the upper ends of the respective sections 150,152 are also provided to reinforce the structure. The illustrated frame 64 also comprises an upper cross-member indicated at 170 in FIGS. 9 and 10. The cross-members 154,170 may be of a box-like construction as shown with cross-member 154 providing some support for the radiator 60 (see FIG. 9) and cross-member 170 being positioned along the upper edge of the radiator. A stepped flange 172 is mounted to cross-member 154 with the upwardly and outwardly positioned step of flange 172 providing support to components such as the charge air cooler 59. In addition, a downwardly stepped flange 174 overlies and may be fastened to the cross-member 170 (see FIGS. 9 and 10). The lower and outwardly positioned step portion 176 (FIG. 10) of flange 174 engages the charge air cooler and the upper step portion 177 of flange 174 engages the radiator in this example. Flange 174 and step 176 are also shown in FIG. 8A. As best seen in FIG. 8, upright section 150 comprises an upright flange portion 180 which projects toward upright member 152 and forwardly of the air plenum mount 114. A fastener, such as a bolt 182, secures flange 180 to mount 114 and thereby connects the upright 150 to the associated plenum mount 114. The same flange mounting structure may be used for connecting upright 152 to the mount 116 at the rear portion 86 of the plenum opening 52.

Figure 10:
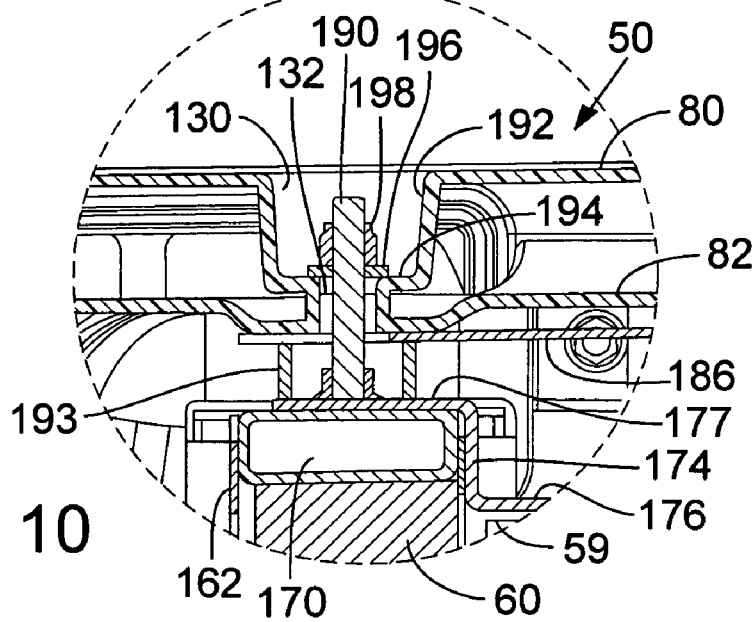
FIG. 10 is an enlarged view of a portion of the plenum shown in FIG. 9, the portion being circled and designated FIG. 10 in FIG. 9.
Figure 13:
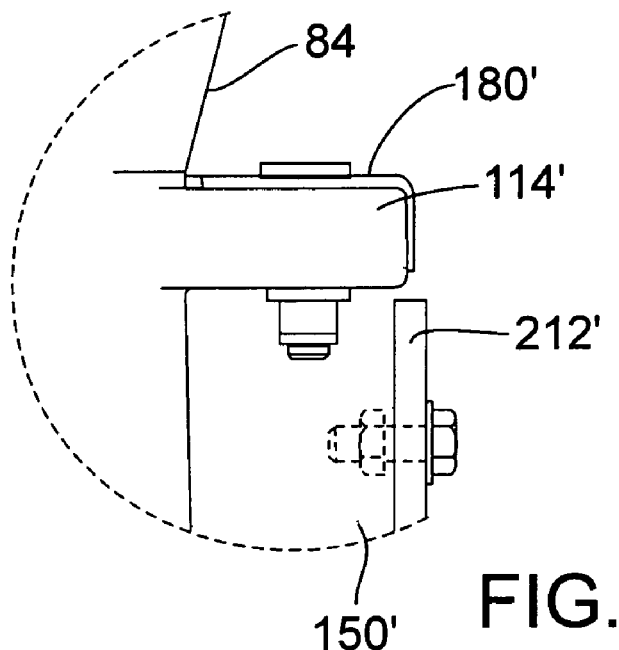
FIG. 13 is an enlarged view of a portion of the exemplary mounting structure utilized in the embodiment of FIG. 12.
Figure 12:
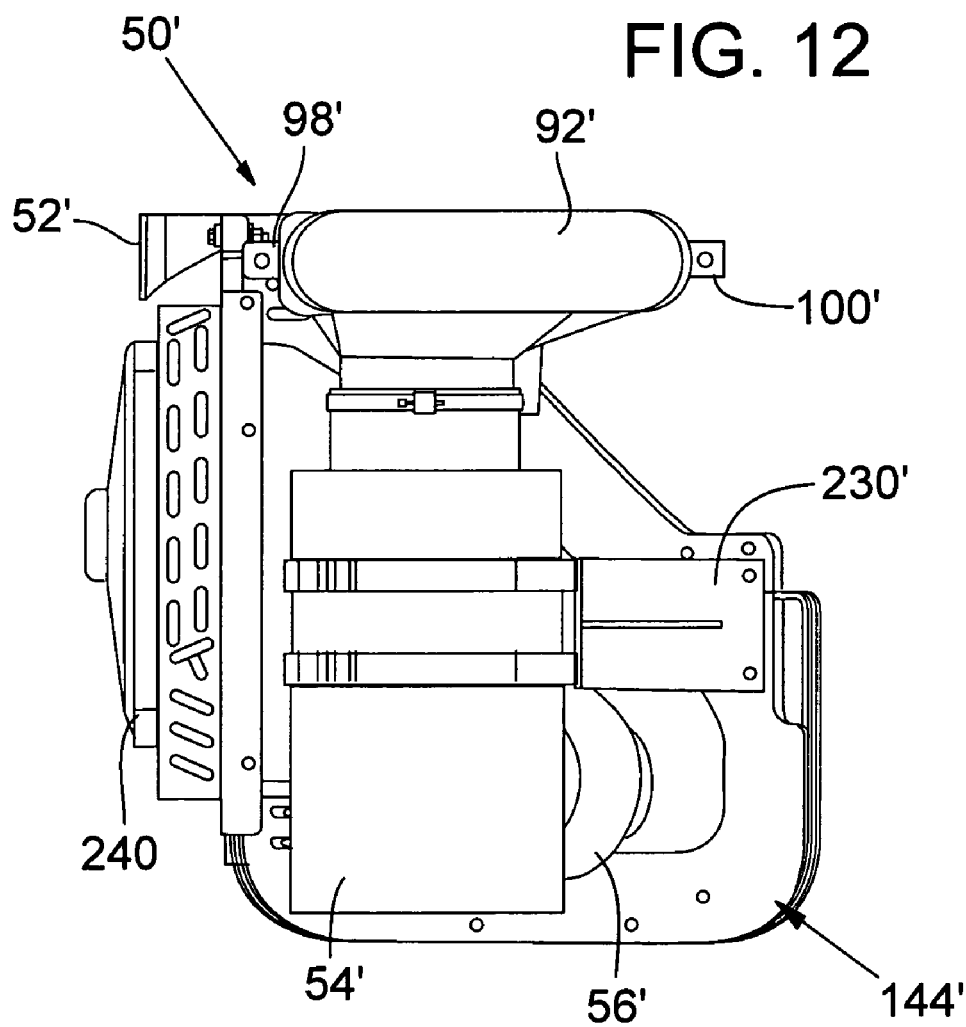
FIG. 12 is an end view of the embodiment of FIG. 11.
Figure 14:
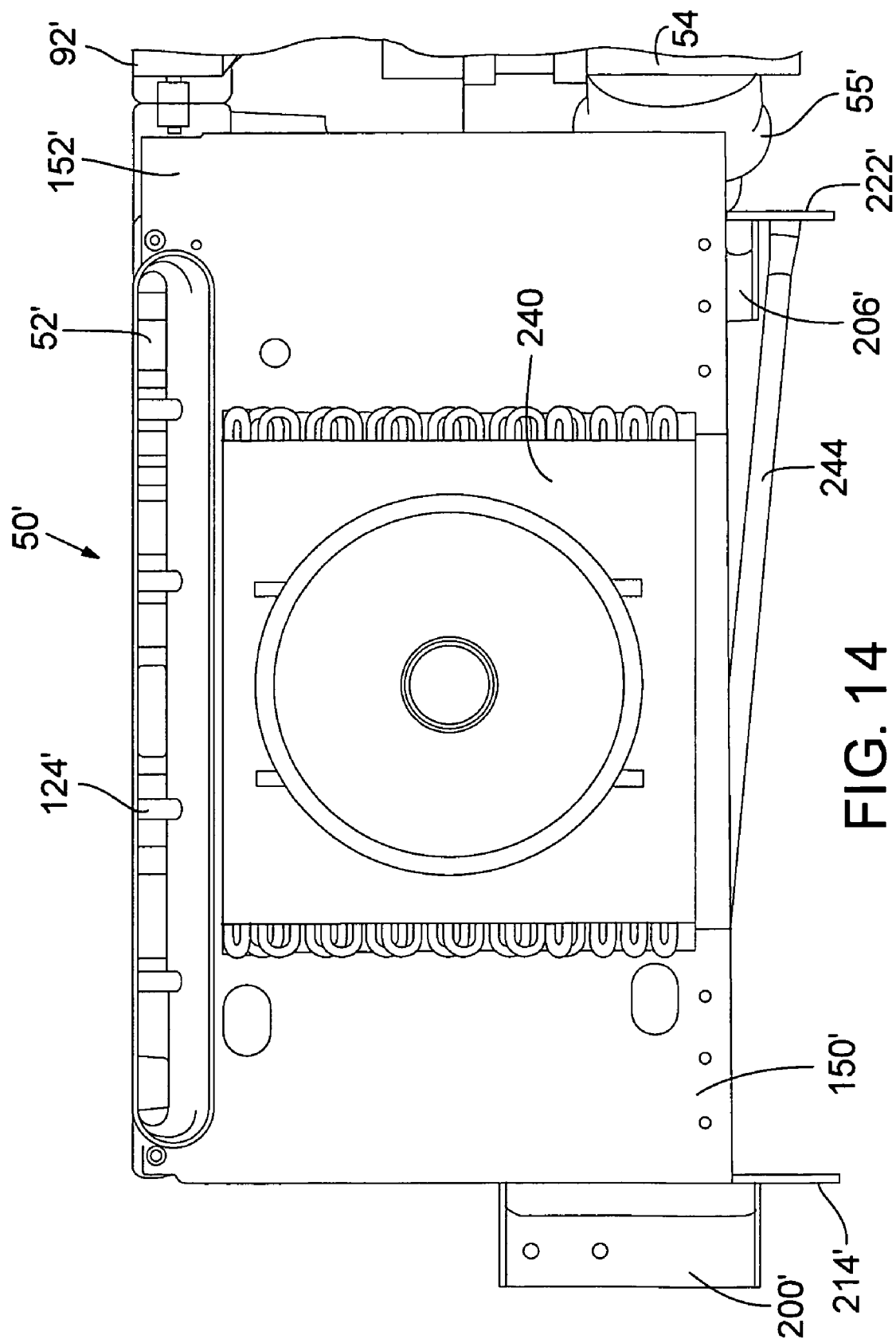
FIG. 14 is a front view of the embodiment of FIG. 11.

As can been seen in FIG. 8A, upright 150, in the form shown, also comprises a rearwardly extending flange portion 186 which, as can be seen in FIG. 10, is positioned beneath the lower surface of plenum panel portion 82 and positioned above the upper step 177 of the step flange 174. With further reference to FIG. 10, an upwardly projecting threaded mounting stud 190 has a lower end portion mounted to the upper surface of step 177. Stud 190 projects upwardly through the opening 132 and through the plenum 50. The opening 132 is sealed from the interior of the plenum in this example by a wall 192 bounding opening 132 and extending between top and bottom portions 80,82 of the plenum. The wall 192 defines an opening which is enlarged at its upper end and narrows at its lower end. The wall 192 defines a shelf or stop surface 194 spaced below the upper surface of the plenum 50. As can be seen in FIG. 10, a stop engaging piece, such as a washer 196, rests on shelf 194. A fastener, such as a threaded bolt 198, is threaded onto mounting stud 190 and tightened to secure the plenum in place. A spacer, which may be a cylinder 193, projects upwardly from the upper surface of shelf 177 and engages the lower surface of flange 186 when the assembly is tightened. Flange 186 is thus engaged by the upper end of the spacer 193 and by the undersurface of plenum portion 82 when the construction is assembled.

Referring again to FIG. 4, the illustrated supports 142,144 of frame 64 each comprise a respective mounting bracket portion 200,202 with respective frame mounting surfaces 204,206. The mounting surfaces are desirably positioned against the outboard upright surface of the associated frame rail 12 and bolted or otherwise secured to this surface. The illustrated supports 142,144 are each of a generally U-shaped construction in the illustrated example. The U-shaped configuration of members 142,144 allows for the passage of conduits through the gap between the legs of these mounting members. Each of the illustrated supports 142,144 comprises a respective upright portion 208,210 which supports the mounting brackets 202,204 respectively. Support member 142 also comprises respective upper and lower leg portions 212,214. Leg portion 212 may comprise an interconnected extension portion 216. In addition, leg portion 214 may comprise an interconnected extension portion 218. In the same manner, mounting member 144 may comprise an upper leg section 220 with an interconnected extension 224 (FIG. 4) and a lower leg portion 222 with an interconnected extension 226 (FIG. 9). Extensions 216,218 may be mounted to upright 150 and then assembled to the respective leg sections 212,214 at a later time during assembly of the chassis. In the same manner, extensions 224,226 may be mounted to the upright member 152 and then interconnected to the respective leg portions 220,222 at a later time during assembly of the chassis. A mounting bracket 230 carried by support 144 may support air cleaner mounting straps for coupling the air cleaner to bracket 230 and thus to the frame.

FIGS. 11-14 illustrate an alternative embodiment in which an air condenser 240 is mounted to the front of the construction instead of a radiator. In this case, the radiator may, for example, be mounted to the rear of the vehicle. Components in these embodiments which correspond to the components of FIGS. 1-10 have been assigned the same numbers, but with a prime (') designation. These common components will not be discussed in detail. As can be seen in FIG. 11, upper and lower reinforcing diagonal braces 242,244 are provided in this embodiment to reinforce the frame construction. Additional or alternative reinforcements may be utilized in this and other embodiments as well.

The plenum, radiator and/or air conditioner condenser assembly may alternatively be carried by supporting structure at the opposite side of the vehicle from the location shown in the above discussed examples.

Having illustrated and described the principles of our invention with respect to a number of embodiments, it should be apparent to those of ordinary skill in the art that these embodiments may be modified in arrangement and detail without departing from the inventive principles disclosed herein. We claim as our invention all such modifications as fall within the scope and spirit of the following claims.

We claim:

1. A chassis for a vehicle comprising:
   first and second spaced apart elongated frame rail members;
   wheels supporting the frame rail members;
   an engine air intake plenum; and
   a support structure coupling the plenum to at least one of the frame rails with the plenum being positioned entirely at one side of a longitudinal axis of the chassis.

2. A chassis according to claim 1, in which the support structure comprises a frame comprising first and second support portions coupled to one of the first and second frame rail members and extending outwardly from said one frame rail member and also away from the other of the first and second frame rail members.

3. A chassis according to claim 2, in which the support portions each have an upright portion adjacent to said one frame rail and upper and lower spaced apart leg portions-extending from the upright portion and outwardly away from said one frame rail.

4. A chassis according to claim 3, wherein the support portions are each substantially U-shaped.

5. A chassis according to claim 3, wherein each of the upright portions have a respective frame rail bracket mounting portion mounted to the said one frame rail.

6. A chassis according to claim 3, wherein the chassis has a rear axle and the plenum is supported by the support portions rearwardly of the rear axle.

7. A chassis according to claim 2, wherein the support structure comprises a forward frame portion carried by the first and second support portions.

8. A chassis according to claim 7, wherein the frame portion also carries a charge air cooler.

9. A chassis according to claim 7, wherein the frame portion carries an air conditioning condenser.

10. A chassis according to claim 1, wherein the plenum has an air intake opening which is elongated in the same direction as the first and second frame rail members.

11. A chassis according to claim 10, wherein the plenum has an air intake opening with a length to height ratio of at least ten to one.

12. A chassis according to claim 1 wherein the plenum is outside of the space between and above the first and second frame rail members.

13. A chassis for a vehicle comprising:
    first and second spaced apart elongated frame rail members;
    wheels supporting the frame rail members;
    an engine air intake plenum:
    a support structure coupling the plenum to at least one of the frame rails with the plenum being positioned at the side of the chassis;
    wherein the support structure comprises a forward frame portion carried by the first and second support portions; and
    wherein the frame portion carries a radiator facing outwardly from the side of the chassis.

14. A chassis for a vehicle comprising:
    first and second spaced apart elongated frame rail members;
    wheels supporting the frame rail members;
    an engine air intake plenum; and
    a support structure coupling the plenum to at least one of the frame rails with the plenum being positioned at the side of the chassis; and
    wherein the air plenum comprises top and bottom panel portions and plural reinforcements extending between the top and bottom panel portions.

15. A chassis for a vehicle comprising:
    first and second spaced apart elongated frame rail members;
    wheels supporting the frame rail members;
    an engine air intake plenum; and
    a support structure coupling the plenum to at least one of the frame rails with the plenum being positioned at the side of the chassis;
    wherein the air plenum comprises top and bottom panel portions and plural reinforcements extending between the top and bottom panel portions; and
    comprising plural fasteners extending through the plenum and between the top and bottom panel portions, the plural fasteners being coupled to the support structure.

16. An apparatus according to claim 15, in which said plural fasteners each extend through an opening defined by a tubular wall extending between the top and bottom panel portions.

17. A chassis for a vehicle comprising:
    first and second spaced apart elongated frame rail members;
    wheels supporting the frame rail members;
    an engine air intake plenum;
    a framework coupling the plenum to at least one of the frame rails with the plenum having an air intake opening facing away from the side of the chassis;
    wherein the chassis has a rear axle and the plenum is supported rearwardly of the rear axle and outside the space between and above the first and second frame rail members; and
    the plenum has an air intake opening which is elongated in the same direction as the first and second frame rail members.

18. A chassis for a vehicle comprising:
    first and second spaced apart elongated frame rail members;
    wheels supporting the frame rail members;
    an engine air intake plenum;
    a support structure coupling the plenum to at least one of the frame rail members with the plenum comprising an air intake opening entirely at one side of the chassis;
    the support structure comprising first and second support portions coupled to one of the first and second frame rail members and extending outwardly from said one frame rail member and also away from the other of the first and second frame rail members;
    the support portions each comprising an upright portion adjacent to said one frame rail and upper and lower spaced apart leg portions extending from the upright portion and outwardly away from said one frame rail;
    each of the upright portions comprising a respective frame rail bracket mounting portion mounted to the said one frame rail;
    the support structure comprising a forward frame portion carried by the first and second support portions; and
    wherein the plenum comprises an air intake opening which is elongated in the same direction as the first and second frame rail members.

19. A chassis for a vehicle comprising:
    first and second spaced apart elongated frame rail members;
    wheels supporting the frame rail members;
    an engine air intake plenum;

a support structure coupling the plenum to at least one of the frame rail members with the plenum comprising an air intake opening at the side of the chassis;

the support structure comprising first and second support portions coupled to one of the first and second frame rail members and extending outwardly from said one frame rail member and also away from the other of the first and second frame rail members;

the support portions each comprising an upright portion adjacent to said one frame rail and upper and lower spaced apart leg portions extending from the upright portion and outwardly away from said one frame rail;

each of the upright portions comprising a respective frame rail bracket mounting portion mounted to the said one frame rail;

the support structure comprising a forward frame portion carried by the first and second support portions; and wherein the plenum comprises an air intake opening which is elongated in the same direction as the first and second frame rail members; and wherein the plenum comprises top and bottom portions and further comprising plural fasteners extending through the plenum and between the top and bottom portions, the plural fasteners being coupled to the support structure.

20. An apparatus according to claim 19, in which said plural fasteners each extend through an opening defined by a tubular wall extending between the top and bottom portions.

21. A chassis according to claim 20, wherein the chassis has a rear axle and the plenum is supported rearwardly of the rear axle.

22. An engine air intake plenum for a chassis of a vehicle which has first and second frame rail members comprising:

a plenum body comprising an air intake opening which is elongated in the same direction as the first and second frame rail members;

the plenum comprising top and bottom panel portions and plural reinforcements extending between the top and bottom panel portions; and plural fastener receiving openings extending through the plenum and between the top and bottom panel portions.

23. An engine air intake plenum according to claim 22 further comprising a support structure for mounting to one of the frame rail members and fasteners passing through the fastener receiving openings for use in mounting the plenum body to the support structures.

24. A chassis according to claim 22, wherein the plenum has an air intake opening with a length to height ratio of at least ten to one.

25. An apparatus according to claim 22 wherein the air plenum comprises an outlet section and also comprising an air cleaner comprising an inlet section for receiving air flowing through the outlet section of the air plenum, wherein the outlet section comprises a first drain through which water extracted from air flowing through the outlet section may exit, the outlet section comprising an annular restriction member comprising an interior surface through which air flows from the outlet section to the inlet section, the restriction member comprising an exterior surface within the outlet section on which moisture collects from the flowing air.

26. An apparatus according to claim 25 wherein the air cleaner inlet section comprises a second drain through which water from the flowing air may exit.

27. A chassis for a vehicle comprising:

first and second frame rail members;

support means projecting outwardly from one of the frame rail members at a side of the chassis and at a rear end portion of the chassis for supporting an engine air intake plenum; and air intake plenum means mounted to the support means and positioned at the side of the chassis and outside of the space between and above the first and second frame rail members and defining an air intake opening positioned forwardly at the side of the chassis.

28. A chassis for a vehicle having a forward end and a rear end, a rear axle, and first and second sides, the chassis comprising:

first and second frame rail members;

a support structure for mounting a radiator or air condenser member to at least one of the frame rails and at a location along the side of the vehicle and adjacent the rear end of the vehicle; and an air intake plenum mounted to the support structure and positioned both rearwardly of the rear axle and at one side of the chassis.

29. A chassis according to claim 28 wherein the air intake plenum is spaced from the frame rails.

30. A chassis for a vehicle having a forward end and a rear end and first and second sides, the chassis comprising:

first and second frame rail members;

a support structure for mounting a radiator or air condenser member to at least one of the frame rails and at a location along the side of the vehicle and adjacent the rear end of the vehicle;

an air intake plenum mounted to the support structure; and wherein the air plenum comprises an outlet section and also comprising an air cleaner comprising an inlet section for receiving air flowing through the outlet section of the air plenum, wherein the outlet section comprises a first drain through which water extracted from air flowing through the outlet section may exit, the outlet section comprising an annular restriction member comprising an interior surface through which air flows from the outlet section to the inlet section, the restriction member comprising an exterior surface within the outlet section on which moisture collects from the flowing air.

31. An apparatus according to claim 30 wherein the air cleaner inlet section comprises a second drain through which water from the flowing air may exit.

* * * * *